United States Patent
Matsuda et al.

(10) Patent No.: US 11,689,294 B2
(45) Date of Patent: Jun. 27, 2023

(54) OPTICAL RECEIVER

(71) Applicant: Nippon Telegraph and Telephone Corporation, Tokyo (JP)

(72) Inventors: Toshiya Matsuda, Tokyo (JP); Kana Masumoto, Tokyo (JP); Kazuyuki Matsumura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 123 days.

(21) Appl. No.: 17/296,572

(22) PCT Filed: Nov. 15, 2019

(86) PCT No.: PCT/JP2019/044878
§ 371 (c)(1),
(2) Date: May 25, 2021

(87) PCT Pub. No.: WO2020/110778
PCT Pub. Date: Jun. 4, 2020

(65) Prior Publication Data
US 2022/0352990 A1   Nov. 3, 2022

(30) Foreign Application Priority Data
Nov. 27, 2018  (JP) .............................. JP2018-220822

(51) Int. Cl.
*H04B 10/61* (2013.01)
*H04J 14/06* (2006.01)

(52) U.S. Cl.
CPC ....... *H04B 10/614* (2013.01); *H04B 10/6166* (2013.01); *H04J 14/06* (2013.01)

(58) Field of Classification Search
CPC .... H04B 10/614; H04B 10/6166; H04J 14/06
See application file for complete search history.

(56) References Cited

U.S. PATENT DOCUMENTS 6,754,511 B1 * 6/2004 Halford ................ H04B 7/0848
455/562.1
2010/0028011 A1 * 2/2010 Kaneda .............. H04B 10/6161
398/115

(Continued)

OTHER PUBLICATIONS

Chagnon et al., "1 λ, 6 bits/symbol, 280 and 350 GB/s Direct Detection Transceiver using Intensity Modulation, Polarization Multiplexing, and Inter-Polarization Phase Modulation," OFC, 2015, 3 pages.

(Continued)

*Primary Examiner* — Tanya T Motsinger
(74) *Attorney, Agent, or Firm* — Fish & Richardson P.C.

(57) ABSTRACT

[Problem] An optical receiver using a polarization demultiplexing technique is miniaturized.
[Solution] An optical receiver 100A for receiving a polarization multiplexed signal obtained by performing orthogonal polarization multiplexing on two optical signals. The optical receiver includes an IL 1 splitting the polarization multiplexed signal into two transmitted signals that are asymmetric in terms of a light transmission characteristic, O/Es 2a and 2b converting the transmitted signals resulting from the split into electrical signals, a downsampler 3 downsampling the electrical signals resulting from the conversion to generate low-speed digital signals, a calculator 4 calculating coefficients of a polarization separation matrix from the resultant low-speed digital signals, a level adjuster 5A adjusting, in accordance with the coefficients resulting from the calculation, signal levels of the electrical signals resulting from the conversion to generate a plurality of adjustment signals, adders 6Aa and 6Ab adding the generated adjustment signals to generate addition signals, and discriminators 7a and 7b restoring and extracting the two optical signals from the generated addition signals.

8 Claims, 4 Drawing Sheets

(56) References Cited

U.S. PATENT DOCUMENTS

| | | | | |
|---|---|---|---|---|
| 2010/0111531 | A1* | 5/2010 | Tanimura | H04B 10/541 398/152 |
| 2011/0200339 | A1* | 8/2011 | Komaki | H04B 10/65 398/208 |
| 2012/0045208 | A1* | 2/2012 | Yasuda | H04B 10/60 398/65 |
| 2012/0148260 | A1* | 6/2012 | Akiyama | H04B 10/588 398/183 |
| 2013/0034354 | A1* | 2/2013 | Okamoto | H04B 10/671 398/65 |
| 2013/0251370 | A1* | 9/2013 | Ogasahara | H04B 10/6162 398/65 |
| 2014/0119731 | A1* | 5/2014 | Sugitani | H04B 10/614 398/65 |
| 2014/0286638 | A1* | 9/2014 | Yasuda | H04J 14/06 398/65 |
| 2015/0372765 | A1* | 12/2015 | Yasuda | H04B 10/613 398/29 |
| 2019/0020508 | A1* | 1/2019 | Noda | H03H 17/0657 |
| 2019/0123834 | A1* | 4/2019 | Zarubinsky | H04L 25/03159 |
| 2020/0127757 | A1* | 4/2020 | Matsuda | H04J 14/06 |
| 2022/0352990 | A1* | 11/2022 | Matsuda | H04B 10/69 |

OTHER PUBLICATIONS

Kikuchi, "Electronic polarization-division demultiplexing based on digital signal processing in intensity-modulation direct-detection optical communication systems," Optics Express, 2014, 22(2):1971-1980.

Matsuda et al., "Dual-Polarization Intensity-Modulated Signal Transmission with Direct-Detection by Using Asymmetrical Polarization Synthesis," ECOC, 2018, 3 pages.

Oja et al., "The FastICA Algorithm Revisited: Convergence Analysis," IEEE Transactions on Neural Networks, Nov. 2006, 17(6):1370-1381.

* cited by examiner

OPTICAL RECEIVER

CROSS-REFERENCE TO RELATED APPLICATIONS

This application is a National Stage application under 35 U.S.C. § 371 of International Application No. PCT/JP2019/044878, having an International Filing Date of Nov. 15, 2019, which claims priority to Japanese Application Serial No. 2018-220822, filed on Nov. 27, 2018. The disclosure of the prior application is considered part of the disclosure of this application, and is incorporated in its entirety into this application.

TECHNICAL FIELD

The present invention relates to an optical receiver.

BACKGROUND ART

With a rapid increase in traffic in data centers, standardization of 100 Gigabit Ethernet (100 GbE (Ethernet is a trade name)) and development of optical modules have been under way. Prevailing 100 GbE optical modules each include an Intensity Modulation-Direct Detection (IM-DD) transceiver with optical signals with four different wavelengths×25 Gbit/s. For optical interfaces such as optical transceivers in a data center, development of more compact, power-saving modules such as Centum gigabit Form factor Pluggable (CFP) 4 and Quad Small Form-factor Pluggable (QSFP) 28 has been under way.

On the other hand, for direct connection between the data centers, development of optical modules outputting a certain optical signal on a Wavelength Division Multiplexing (WDM) grid has been under way. For example, small modules including optical transceivers such as 10 Giga bit Small Form Factor Pluggable (XFP), Small Form-Factor Pluggable Plus (SFP+), and the like, which are standards for 10 G, have now been commercially available, and the use of these optical modules allows construction of a low-cost WDM system. Additionally, studies for an increased capacity of a wavelength variable optical module have been under way (see, for example, Non Patent Literatures 1 to 3).

CITATION LIST

Non Patent Literature

Non Patent Literature 1: K. Kikuchi, "Electronic polarization-division demultiplexing based on digital signal processing in intensity-modulation direct-detection optical communication systems," Opt. Express, Vol. 22, no. 2 p. 1971 (2014).
Non Patent Literature 2: M. Chagnon et al., "1λ, 6 bits/symbol, 280 and 350 Gb/s Direct Detection Transceiver using Intensity Modulation, Polarization Multiplexing, and Inter-Polarization Phase Modulation," Proc. OFC, Th5B.2, Los Angeles (2015).
Non Patent Literature 3: T. Matsuda et al., "Dual-Polarization Intensity-Modulated Signal Transmission with Direct-Detection by Using Asymmetrical Polarization Synthesis," ECOC2018, Th2.37, (2018).
Non Patent Literature 4: E. Oja et al., "The FastICA Algorithm Revisited: Convergence Analysis," IEEE Trans. Neural Networks, vol. 17, no. 6, pp. 1370-1381, November (2006).

SUMMARY OF THE INVENTION

Technical Problem

In a case where 100 GbE and 40 GbE optical modules using optical signals with different wavelengths as described above are employed in a WDM system, an optical demultiplexer inside the optical module has a complex configuration in order to achieve a wavelength variable function, thus impeding miniaturization of optical modules.

For implementation of high capacity wavelength variable optical modules, it is considered to use not only wavelength division multiplexing, but also other multiplexing techniques Here, as the other multiplexing techniques, a polarization demultiplexing technique is effective in view of the lack of excessive degradation of reception sensitivity in multiplexing and in view of spectral efficiency. However, polarization demultiplexing techniques of the related art require a complex reception system configuration (see Non Patent Literatures 1 and 2), or require very-high-speed electrical circuits that operate at or above the baud rate of signals (see Non Patent Literatures 1 to 3). Thus, optical receivers using the polarization demultiplexing technique of the related art are large in scale, and are difficult to miniaturize.

In view of such circumstances, an object of the present invention is to miniaturize an optical receiver using the polarization demultiplexing technique.

Means for Solving the Problem

To achieve the object described above, the invention according to a first aspect is an optical receiver configured to receive a polarization multiplexed signal obtained by performing orthogonal polarization multiplexing on two optical signals, the optical receiver including: an interleaver configured to split the polarization multiplexed signal into two transmitted signals that are asymmetric in terms of a light transmission characteristic; an optical/electrical converter configured to convert the transmitted signals resulting from the split into electrical signals; a downsampler configured to downsample the electrical signals resulting from the conversion to generate low-speed digital signals; a calculator configured to calculate coefficients of a polarization separation matrix from the generated low-speed digital signals; a level adjuster configured to adjust, in accordance with the coefficients resulting from the calculation, signal levels of the electrical signals resulting from the conversion to generate a plurality of adjustment signals; an adder configured to add the generated adjustment signals to generate addition signals; and a discriminator configured to restore and extract the two optical signals from the generated addition signals.

In the invention according to the first aspect, no iterative operation is performed in the level adjuster and the adder, which require high-speed processing. This allows elimination of a need for a buffer memory for iterative operations. As a result, an increase in the circuit scale of the optical receiver can be suppressed. Downsampling by the downsampler also significantly reduces the amount of calculation for signal processing of the electrical signals output from the optical/electrical converter. This eliminates a need for a very-high-speed electrical circuit operating at or above the baud rate of signals, contributing to the suppression of an increase in the scale of the optical receiver.

Accordingly, the optical receiver using the polarization demultiplexing technique can be miniaturized.

The invention according to a second aspect is the optical receiver according to the first aspect, further including a first A/D converter configured to convert, into digital signals, the electrical signals being analog signals, wherein the level adjuster and the adder are configured as a digital circuit configured to process the digital signals resulting from the conversion.

In the invention according to the second aspect, the level adjuster and the adder are configured as a digital circuit. In a case where the optical receiver is mass-produced, manufacturing costs can be reduced due to economies of mass production effect.

The invention according to a third aspect is the optical receiver according to the first aspect, further including a second A/D converter configured to convert, into digital signals, the electrical signals being analog signals, the second A/D converter functioning as the downsampler, wherein the level adjuster and the adder are configured as an analog circuit configured to process the electrical signals.

In the invention according to the third aspect, in a case where optical receivers are manufactured in small quantities, configuring the level adjuster and the adder as an analog circuit eliminates a need for a plurality of operations for designing and manufacturing a photo mask, which are required to manufacture digital circuits. This enables a reduction in the initial manufacturing cost of the optical receiver.

Effects of the Invention

According to the present invention, the optical receiver using the polarization demultiplexing technique can be miniaturized.

DESCRIPTION OF EMBODIMENTS

Hereinafter, embodiments of the present disclosure will be described in detail with reference to the drawings.

The optical receiver of each of the embodiments is one of a plurality of optical receivers included in a receiving optical module. For example, a receiving optical module and a transmitting optical module constitute an optical transmission system using a multi-carrier optical signal. The optical transmission system including the optical receiver of each of the embodiments can perform, for example, polarization separation using digital signal processing.

First Embodiment

Figure 1:
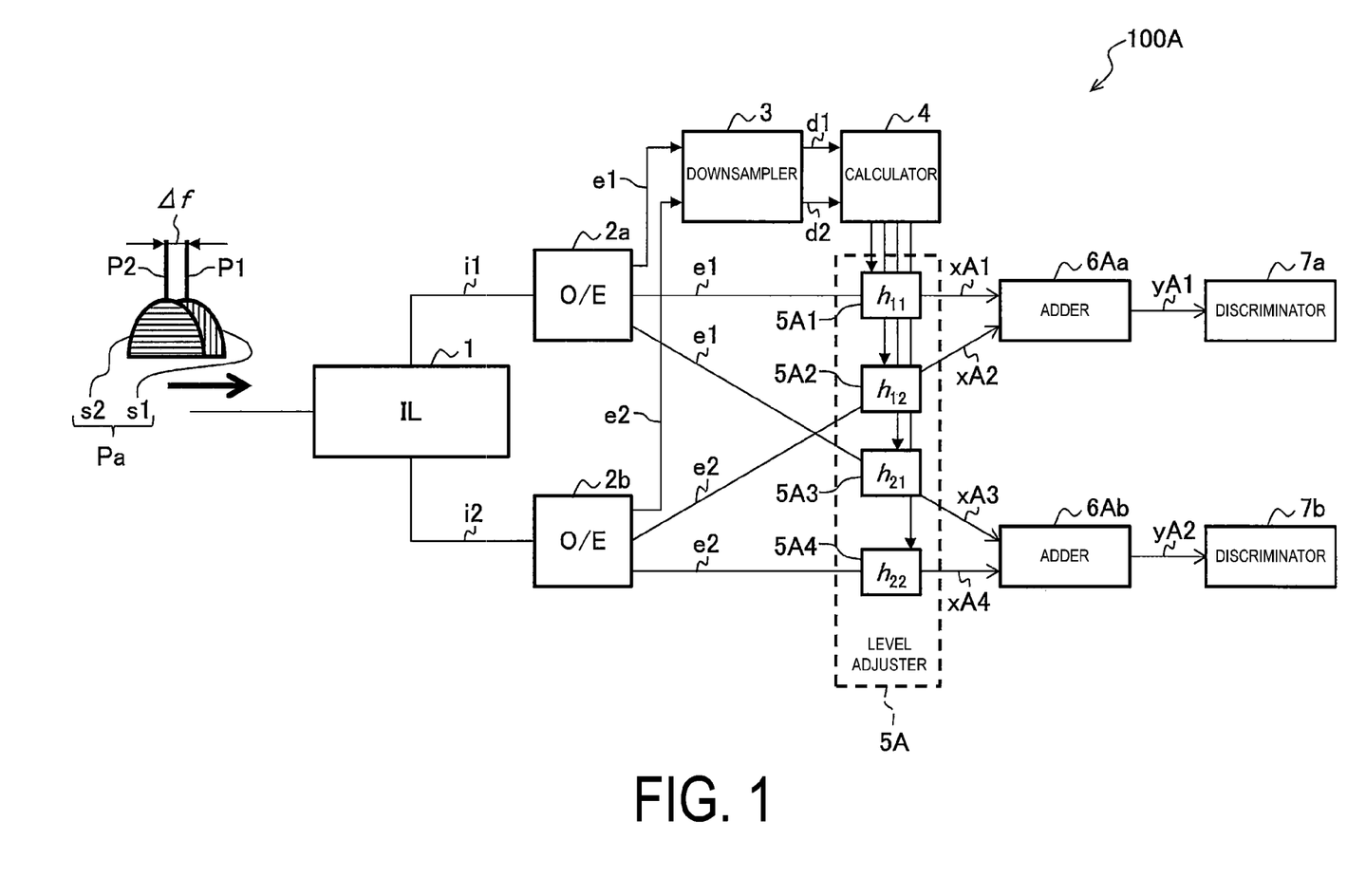
FIG. 1 is a diagram illustrating a configuration of an optical receiver according to a first embodiment.

As illustrated in FIG. 1, a Dual Polarization (DP)-On Off Keying (OOK) signal Pa including two OOK signals s1 and s2 are input to an optical receiver 100A of the present embodiment. The OOK signals s1 and s2 are two optical signals generated by an optical transmitter (not illustrated) communicatively connected to the optical receiver 100A. The optical transmitter is described in, for example, Non Patent Literature 3, and detailed description of the optical transmitter is omitted. The optical transmitter includes a plurality of transmitting optical modules.

The OOK signal s1 is an optical signal obtained by causing the optical transmitter to optically modulate, with first data (bit sequence of 0 and 1), a first carrier (optical carrier) output by a first channel (Ch1) corresponding to one of two channels of different frequencies.

The OOK signal s2 is an optical signal obtained by causing the optical transmitter to optically modulate, with second data (bit sequence of 0 and 1), a second carrier (optical carrier) output by a second channel (Ch2) corresponding to the other of the two channels of different frequencies.

The DP-OOK signal Pa is a polarization multiplexed signal generated by a Polarization Beam Splitter (PBS) (not illustrated) included in the optical transmitter. The polarization beam splitter generates a DP-OOK signal Pa by shifting the phases of the first carrier and the second carrier by 90 degrees from each other and performing orthogonal polarization multiplexing on the OOK signal s1 of Ch1 and the OOK signal s2 of Ch2. The OOK signal s1 of Ch1 and the OOK signal s2 of Ch2 are signals including the first carrier and the second carrier in which the frequency difference between the peak components P1 and P2 of the carrier frequencies (f0±f/2) is Δf, f0 being at the center between the frequencies of Ch1 and Ch2.

Note that the OOK signals s1 and s2 on which orthogonal polarization-multiplexing is performed for generation of the DP-OOK signal Pa do not interfere with each other because of the different frequencies.

As illustrated in FIG. 1, the optical receiver 100A includes an Interleaver (IL) 1, Optical/Electrical converters (O/Es) 2a and 2b, a downsampler 3, a calculator 4, a level adjuster 5A, adders 6Aa and 6Ab, and discriminators 7a and 7b.

The IL 1 is an asymmetric filter including one input and two outputs and having a predetermined optical transmission characteristic (transmittance). When one optical signal is input to the IL 1, the IL 1 outputs a large amount of signals having a first wavelength from one output side, and outputs, from the other output side, a large amount of signals having a second wavelength that is symmetric to the first wavelength. The IL 1 has transmission characteristics crossing at a WDM grid, and a Full-Scale Range (FSR) corresponding to the width of the input range has a period that is equal to or twice as long as the WDM grid. In other words, the IL 1 is a filter having the optical transmission characteristic that the FSR has a period that is equal to or twice as long as the frequency grid interval, the filter having asymmetric outputs.

When the DP-OOK signal Pa passes through the IL 1, the OOK signal s1 is more likely to pass through the IL 1 as a signal on an output side connected to the O/E 2a, and the OOK signal s2 is more likely to pass through the IL 1 as a signal on an output side connected to the O/E 2b.

For further description, the OOK signal s1 on the Ch1 sending side is transmitted through the IL 1 such that the amount of the OOK signal s1 is twice larger than the amount of the OOK signal s2 on Ch2, and the corresponding transmitted signal i1 is output to the O/E 2a. In this case, the transmitted signal i1 is expressed by i1=(s1×2)+(s2×1).

Similarly, the OOK signal s2 on the Ch2 sending side is transmitted through the IL 1 such that the amount of the OOK signal s2 is twice larger than the amount of the OOK signal s1 on Ch1, and the corresponding transmitted signal i2 is output to the O/E 2b. In this case, the transmitted signal i2 is expressed by i2=(s1×1)+(s2×2).

Note that the ratio between the transmittances (or the amounts of transmission) of the OOK signals s1 and s2 set by the IL 1 is not limited to the above-described value, and can be changed as appropriate.

In the IL 1 as described above, for the DP-OOK signal Pa including the OOK signals s1 and s2 with the carrier frequencies f0±f/2, the intersection of the transmission characteristics of the two output ports is located on the central position f0.

The O/Es 2a and 2b directly detect two outputs from the IL 1, in other words, the transmitted signals i1 and i2, which are optical signals, and convert the transmitted signals i1 and i2 into electrical signals e1 and e2 and output the electrical signals e1 and e2, respectively. The O/Es 2a and 2b may be, for example, semiconductor elements having capacitances varying according to input light, but are not limited to such semiconductor elements. The O/E 2a splits and outputs the electrical signal e1 to the downsampler 3 and to the level adjuster 5A. The O/E 2b splits and outputs the electrical signal e2 to the downsampler 3 and to the level adjuster 5A.

The downsampler 3 downsamples the electrical signals e1 and e2 output from the O/Es 2a and 2b. A sampling frequency used by the downsampler 3 is smaller than a sampling frequency used when the O/E 2a and 2b converts the transmitted signals i1 and i2 into the electrical signals e1 and e2. When downsampling the electrical signal e1, the downsampler 3 generates a digital signal d1 at a low speed (low-speed digital signal) and outputs the low-speed digital signal d1 to the calculator 4. When downsampling the electrical signal e2, the downsampler 3 generates a low-speed digital signal d2 and outputs the low-speed digital signal d2 to the calculator 4.

The calculator 4 calculates coefficients of a polarization separation matrix from the digital signals d1 and d2, which are output from the downsampler 3. The polarization separation matrix results from orthogonal polarization multiplexing. The polarization separation matrix is a separation matrix for retrieving the OOK signals s1 and s2, which are independent of each other, from the digital signals d1 and d2 in which the OOK signals s1 and s2 are mixed at different intensity rates. The OOK signals s1 and s2, used as source signals, are two components and the digital signals d1 and d2, used as observation signals, are also two components, and thus the polarization separation matrix is a 2×2 matrix. The coefficients of the polarization separation matrix are respective components $h_{ij}$ (i and j=1 and 2) of the 2×2 matrix.

The calculator 4 can estimate, by using a well-known statistical algorithm, the polarization separation matrix even from downsampled digital signals d1 and d2. The well-known statistical algorithm may be, for example, Independent Component Analysis (ICA) described in Non Patent Literature 4, but is not limited thereto. The calculator 4 calculates each coefficient $h_{ij}$ of the polarization separation matrix as an estimate value of the polarization separation matrix, and outputs the estimate value to the level adjuster 5A.

The level adjuster 5A adjusts the signal levels (signal intensities) of the electrical signals e1 and e2 split and output from the O/Es 2a and 2b, in accordance with the coefficients $h_{ij}$ of the polarization separation matrix output from the calculator 4. The level adjuster 5A can include, for example, coefficient-by-coefficient adjusters 5A1 to 5A4.

The coefficient-by-coefficient adjuster 5A1 can adjust the signal level of the electrical signal e1 output from the O/E 2a in accordance with a coefficient $h_{11}$ output from the calculator 4. The coefficient-by-coefficient adjuster 5A1 adjusts the signal level to generate an adjustment signal xA1 from the electrical signal e1 and outputs the adjustment signal xA1 to the adder 6Aa. The coefficient-by-coefficient adjuster 5A2 can adjust the signal level of the electrical signal e2 output from the O/E 2b in accordance with a coefficient $h_{12}$ output from the calculator 4. The coefficient-by-coefficient adjuster 5A2 adjusts the signal level to generate an adjustment signal xA2 from the electrical signal e2 and outputs the adjustment signal xA2 to the adder 6Aa.

The coefficient-by-coefficient adjuster 5A3 can adjust the signal level of the electrical signal e1 output from the O/E 2a in accordance with a coefficient $h_{21}$ output from the calculator 4. The coefficient-by-coefficient adjuster 5A3 adjusts the signal level to generate an adjustment signal xA3 from the electrical signal e1 and outputs the adjustment signal xA3 to the adder 6Ab.

The coefficient-by-coefficient adjuster 5A4 can adjust the signal level of the electrical signal e2 output from the O/E 2b in accordance with a coefficient $h_{22}$ output from the calculator 4. The coefficient-by-coefficient adjuster 5A4 adjusts the signal level to generate an adjustment signal xA4 from the electrical signal e2 and outputs the adjustment signal xA4 to the adder 6Ab.

The level adjuster 5A can generate the adjustment signals xA1 to xA4 as digital signals or as analog signals.

The adder 6Aa adds the adjustment signals xA1 and xA2 output from the level adjuster 5A. The adder 6Aa adds the adjustment signals xA1 and xA2 to generate an addition signal yA1 and outputs the addition signal yA1 to the discriminator 7a.

The adder 6Ab adds the adjustment signals xA3 and xA4 output from the level adjuster 5A. The adder 6Ab adds the adjustment signals xA3 and xA4 to generate an addition signal yA2 and outputs the addition signal yA2 to the discriminator 7b.

The adders 6Aa and 6Ab can generate the addition signals yA1 and yA2 as digital signals or as analog signals.

The discriminator 7a restores and extracts the OOK signal s1 from the addition signal yA1 output from the adder 6Aa. The discriminator 7b restores and extracts the OOK signal s2 from the addition signal yA2 output from the adder 6Ab. A technique used by the discriminators 7a and 7b to restore and extract the OOK signals s1 and s2 is well known, and detailed description of the technique is omitted.

The OOK signals s1 and s2 extracted by the discriminators 7a and 7b are digital signals, and predetermined digital signal processing is executed. For example, an optical transmitter (not illustrated) executes calculation processing for determining the first data and the second data used to optically modulate the first carrier and the second carrier output by Ch1 and Ch2 to generate the OOK signals s1 and s2.

The downsampler 3, the calculator 4, the level adjuster 5A, the adders 6Aa and 6Ab, and the discriminators 7a and 7b illustrated in FIG. 1 can constitute a Digital Signal Processor (DSP) of the optical receiver 100A. The DSP of the optical receiver 100A can execute, on the restored and extracted digital signal, signal processing in the optical receiver 100A at frequency intervals (frequency grids) at a low speed in a range at which a fluctuation in the coefficient of the polarization separation matrix is followed. The DSP of the optical receiver 100A can update each coefficient $h_{ij}$ of the polarization separation matrix in accordance with the results of the signal processing. Thus, the signal level adjustment by the level adjuster 5A is optimized.

As described above, the optical receiver 100A of the present embodiment does not perform iterative operations in the level adjuster 5A and the adders 6Aa and 6Ab, which require high-speed processing, eliminating a need for a buffer memory for iterative operations. As a result, an increase in the circuit scale of the optical receiver 100A can be suppressed.

Downsampling of the downsampler 3 also significantly reduces the amount of calculation for signal processing of the electrical signals e1 and e2, which are output from O/Es 2a and 2b. As a result, no very-high-speed electrical circuit operating at or above the baud rate of signals is needed, contributing to the suppression of an increase in the circuit scale of the optical receiver 100A.

Accordingly, the optical receiver using the polarization demultiplexing technique can be miniaturized.

Second Embodiment

A second embodiment will be described mainly in terms of differences from the first embodiment, and duplicate descriptions are omitted.

Figure 2:
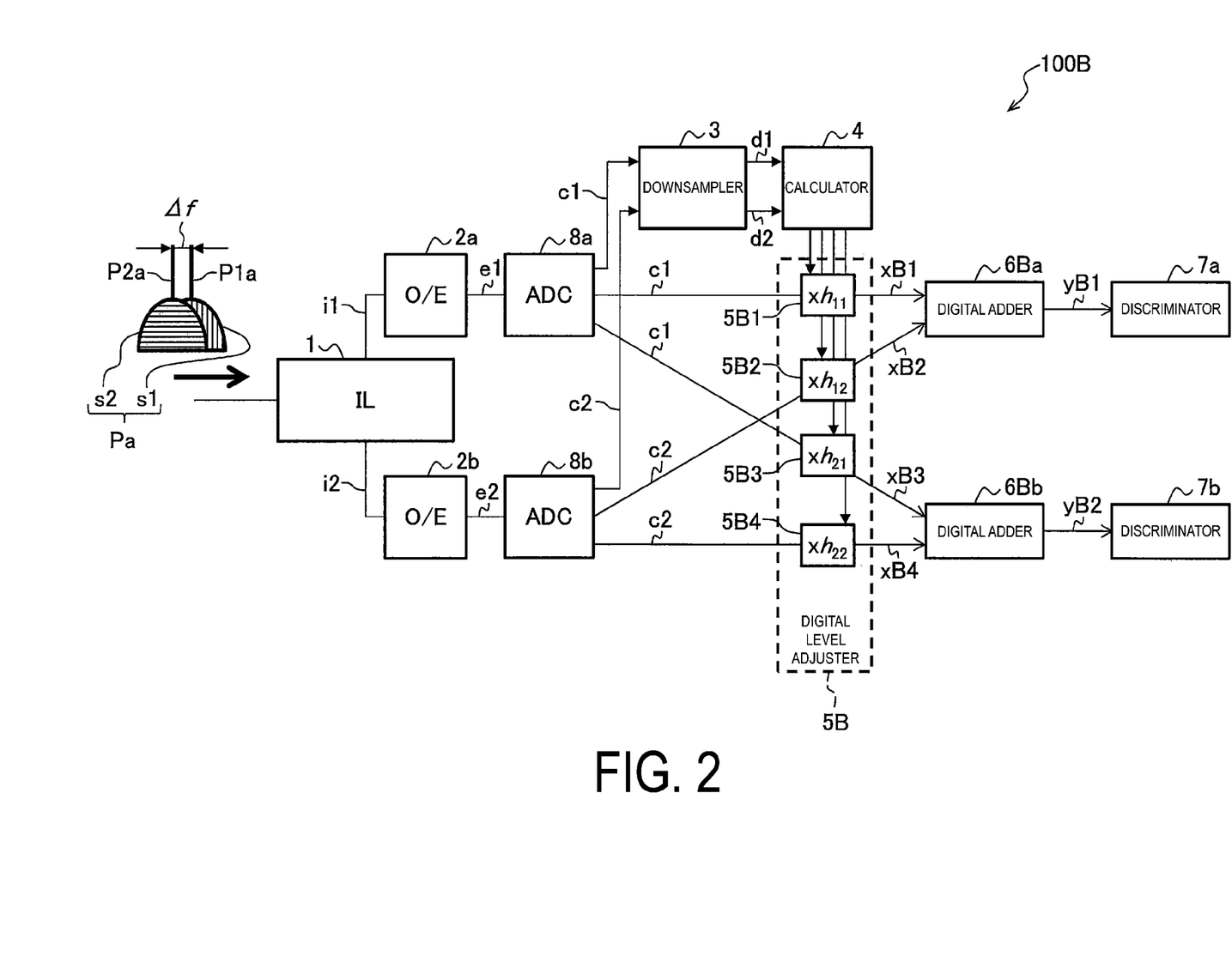
FIG. 2 is a diagram illustrating a configuration of an optical receiver according to a second embodiment.

As illustrated in FIG. 2, an optical receiver 100B of the second embodiment includes an IL 1, O/Es 2a and 2b, Digital Analog Converters (ADCs: first A/D converters) 8a and 8b, a downsampler 3, a calculator 4, a digital level adjuster 5B, digital adders 6Ba and 6Bb, and discriminators 7a and 7b. The IL 1, the O/Es 2a and 2b, the downsampler 3, the calculator 4, and the discriminators 7a and 7b are the same as those provided in the optical receiver 100A (FIG. 1) of the first embodiment.

The O/E 2a outputs an electrical signal e1 to the ADC 8a. The O/E 2b outputs an electrical signal e2 to the ADC 8b.

The ADCs 8a and 8b convert the electrical signals e1 and e2, which are analog signals, into digital signals c1 and c2. The ADC 8a splits and outputs the digital signal c1 to the downsampler 3 and to the digital level adjuster 5B. The ADC 8b splits and outputs the digital signal c2 to the downsampler 3 and to the digital level adjuster 5B.

The downsampler 3 downsamples the digital signals c1 and c2, which are output from the ADCs 8a and 8b. A sampling frequency used by the downsampler 3 is smaller than a sampling frequency used when the ADCs 8a and 8b convert the electrical signals e1 and e2 into the digital signals c1 and c2. The downsampler 3 downsamples the digital signal c1 to generate a low-speed digital signal d1 and outputs the low-speed digital signal d1 to the calculator 4. In addition, the downsampler 3 downsamples the digital signal c2 to generate a low-speed digital signal d2 and outputs the low-speed digital signal d2 to the calculator 4.

The calculator 4 calculates each coefficient $xh_{ij}$ of a polarization separation matrix as an estimate value of the polarization separation matrix, and outputs the coefficient to the digital level adjuster 5B.

The digital level adjuster 5B adjusts the signal levels (signal strength) of the digital signals c1 and c2 split and output from the ADCs 8a and 8b, in accordance with the coefficients $xh_{ij}$ of the polarization separation matrix output from the calculator 4. Compared to the level adjuster 5A (FIG. 1), the digital level adjuster 5B corresponds to a level adjuster in which output signals are limited to digital signals. The digital level adjuster 5B can include, for example, a coefficient-by-coefficient adjusters 5B1 to 5B4.

The coefficient-by-coefficient adjuster 5B1 can adjust the signal level of the digital signal c1 output from the ADC 8a in accordance with a coefficient $xh_{11}$ output from the calculator 4. The coefficient-by-coefficient adjuster 5B1 adjusts the signal level to generate an adjustment signal xB1 from the digital signal c1 and outputs the adjustment signal xB1 to the digital adder 6Ba.

The coefficient-by-coefficient adjuster 5B2 can adjust the signal level of the digital signal c2 output from the ADC 8b in accordance with a coefficient $xh_{12}$ output from the calculator 4. The coefficient-by-coefficient adjuster 5B2 adjusts the signal level to generate an adjustment signal xB2 from the digital signal c2 and outputs the adjustment signal xB2 to the digital adder 6Ba. The coefficient-by-coefficient adjuster 5B3 can adjust the signal level of the digital signal c1 output from the ADC 8a in accordance with a coefficient $xh_{21}$ output from the calculator 4. The coefficient-by-coefficient adjuster 5B3 adjusts the signal level to generate an adjustment signal xB3 from the digital signal c1 and outputs the adjustment signal xB3 to the digital adder 6Bb. The coefficient-by-coefficient adjuster 5A4 can adjust the signal level of the digital signal c2 output from the ADC 8b in accordance with a coefficient $xh_{22}$ output from the calculator 4. The coefficient-by-coefficient adjuster 5B4 adjusts the signal level to generate an adjustment signal xB4 from the digital signal c2 and outputs the adjustment signal xB4 to the digital adder 6Bb.

The digital level adjuster 5B can be configured as a part of a digital circuit processing the digital signals c1 and c2. The digital level adjuster 5B generates the adjustment signals xB1 to xB4 as digital signals.

Compared to the adders 6Aa and 6Ab (FIG. 1), the digital adders 6Ba and 6Ba correspond to adders in which input signals are limited to digital signals.

The digital adder 6Ba adds the adjustment signals xB1 and xB2 output from the digital level adjuster 5B. The digital adder 6Ba adds the adjustment signals xB1 and xB2 to generate an addition signal yB1 and outputs the addition signal yB1 to the discriminator 7a.

The digital adder 6Bb adds the adjustment signals xB3 and xB4 output from the digital level adjuster 5B. The digital adder 6Bb adds the adjustment signals xB3 and xB4 to generate an addition signal yB2 and outputs the addition signal yB2 to the discriminator 7b.

The digital adders 6Ba and 6Bb can be configured as a part of a digital circuit processing the digital signals c1 and c2. The digital adders 6Ba and 6Bb generate the addition signals yB1 and yB2 as digital signals.

The discriminator 7a restores and extracts the OOK signal s1 from the addition signal yB1 output from the digital adder 6Ba. The discriminator 7b restores and extracts the OOK signal s2 from the addition signal yB2 output from the adder 6Bb.

The downsampler 3, the calculator 4, the digital level adjuster 5B, the digital adders 6Ba and 6Bb, and the discriminators 7a and 7b illustrated in FIG. 2 can constitute a DSP of the optical receiver 100B.

According to the optical receiver 100B of the second embodiment, the level adjuster and the adder are configured as a digital circuit. Thus, in a case where the optical receiver 100B is mass-produced, manufacturing costs can be reduced due to economies of mass production.

Third Embodiment

A third embodiment will be described mainly in terms of differences from the first embodiment and the second embodiment, and duplicate descriptions are omitted.

Figure 3:
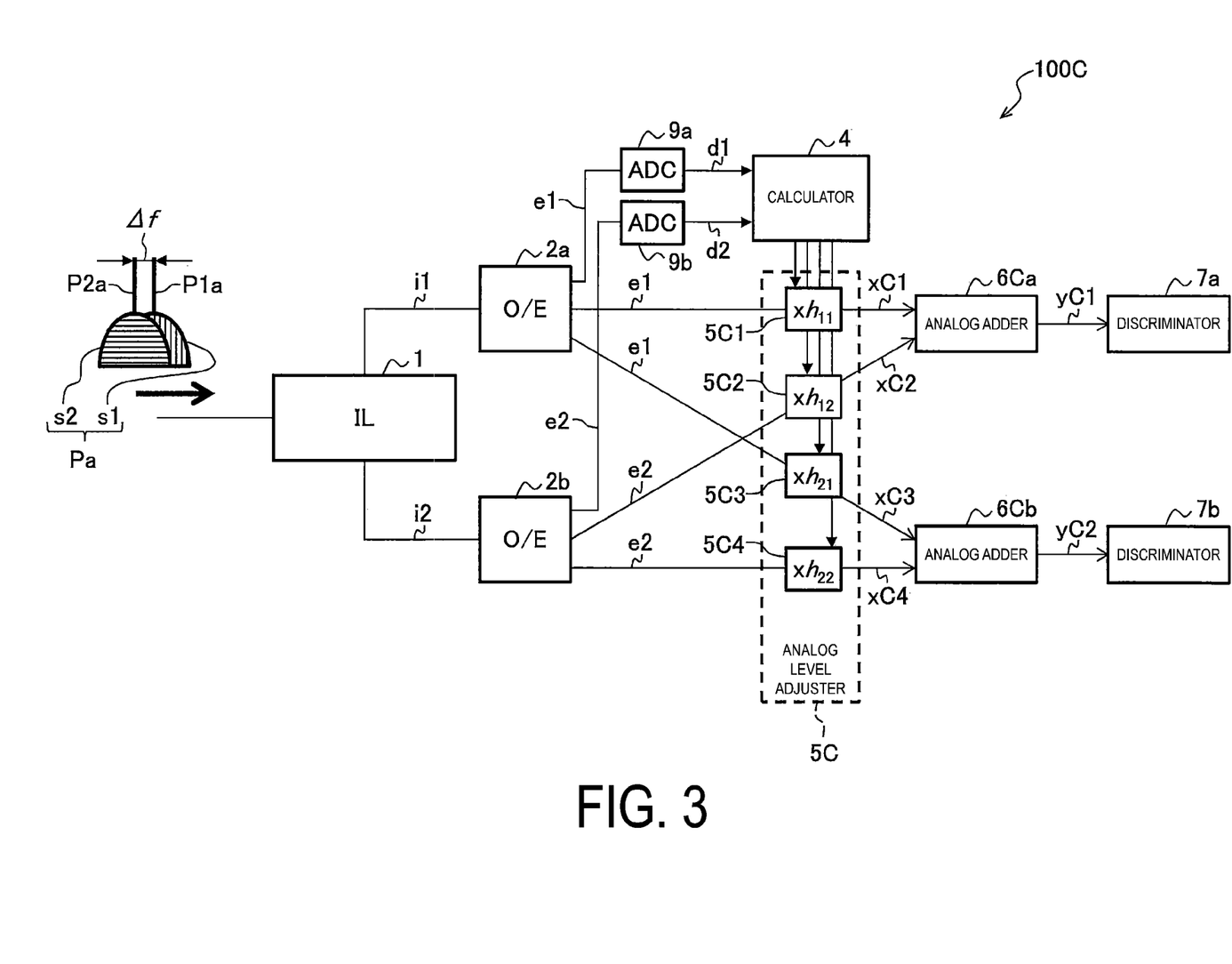
FIG. 3 is a diagram illustrating a configuration of an optical receiver according to a third embodiment.

As illustrated in FIG. 3, the optical receiver 100C of the third embodiment includes an IL 1, O/Es 2a and 2b, ADCs 9a and 9b (second A/D converter), a calculator 4, an analog level adjuster 5C, analog adders 6Ca and 6Cb, and discriminators 7a and 7b. The IL 1, the O/Es 2a and 2b, the calculator 4, and the discriminators 7a and 7b are similar to the corresponding components provided in the optical receiver 100A (FIG. 1) of the first embodiment.

The O/E 2a splits and outputs an electrical signal e1 to the ADC 9a and to the analog level adjuster 5C. The O/E 2b splits and outputs an electrical signal e2 to the ADC 9b and to the analog level adjuster 5C.

The ADCs 9a and 9b convert the electrical signals e1 and e2, which are analog signals, into digital signals d1 and d2, respectively. The ADCs 9a and 9b function as the downsampler 3 (FIGS. 1 and 2) and downsamples the electrical signals e1 and e2. A sampling frequency used by the ADCs 9a and 9b is smaller than a sampling frequency used when the O/Es 2a and 2b converts transmitted signals i1 and i2 into the electrical signals e1 and e2. The ADC 9a downsamples the electrical signal e1 to generate a low-speed digital signal d1 and outputs the low-speed digital signal d1 to the calculator 4. The ADC 9b downsamples the electrical signal e2 to generate a low-speed digital signal d2 and outputs the low-speed digital signal d2 to the calculator 4.

The calculator 4 calculates each coefficient $xh_{ij}$ of a polarization separation matrix as an estimate value for the polarization separation matrix, and outputs the coefficient to the analog level adjuster 5C.

The analog level adjuster 5C adjusts the signal levels (signal intensities) of the electrical signals e1 and e2 split and output from the O/Es 2a and 2b in accordance with the coefficients $xh_{ij}$ of the polarization separation matrix output from the calculator 4. Compared to the level adjuster 5A (FIG. 1), the analog level adjuster 5C corresponds to a level adjuster in which output signals are limited to analog signals. The analog level adjuster 5C can include, for example, coefficient-by-coefficient adjusters 5C1 to 5C4.

The coefficient-by-coefficient adjuster 5C1 can adjust the signal level of the electrical signal e1 output from the O/E 2a in accordance with a coefficient $xh_{11}$ output from the calculator 4. The coefficient-by-coefficient adjuster 5C1 adjusts the signal level to generate an adjustment signal xC1 from the electrical signal e1 and outputs the adjustment signal xC1 to the analog adder 6Ca.

The coefficient-by-coefficient adjuster 5C2 can adjust the signal level of the electrical signal e2 output from the O/E 2b in accordance with a coefficient $xh_{12}$ output from the calculator 4. The coefficient-by-coefficient adjuster 5C2 adjusts the signal level to generate an adjustment signal xC2 from the electrical signal e2 and outputs the adjustment signal xC2 to the analog adder 6Ca. The coefficient-by-coefficient adjuster 5C3 can adjust the signal level of the electrical signal e1 output from the O/E 2a in accordance with a coefficient $xh_{21}$ output from the calculator 4. The coefficient-by-coefficient adjuster 5C3 adjusts the signal level to generate an adjustment signal xC3 from the electrical signal e1 and outputs the adjustment signal xC3 to the analog adder 6Cb. The coefficient-by-coefficient adjuster 5C4 can adjust the signal level of the electrical signal e2 output from the O/E 2b in accordance with a coefficient $xh_{22}$ output from the calculator 4. The coefficient-by-coefficient adjuster 5C4 adjusts the signal level to generate an adjustment signal xC4 from the electrical signal e2 and outputs the adjustment signal xC4 to the analog adder 6Cb.

The analog level adjuster 5C can be configured as a part of an analog circuit processing the electrical signals e1 and e2, which are analog signals. The analog level adjuster 5C generates the adjustment signals xC1 to xC4 as analog signals.

Compared to the adders 6Aa and 6Ab (FIG. 1), the analog adders 6Ca and 6Ca corresponds to adders in which input signals are limited to analog signals.

The analog adder 6Ca adds the adjustment signals xC1 and xC2 output from the analog level adjuster 5C. The analog adder 6Ca adds the adjustment signals xC1 and xC2 to generate an addition signal yC1 and outputs the addition signal yC1 to the discriminator 7a.

The analog adder 6Cb adds the adjustment signals xC3 and xC4 output from the analog level adjuster 5C. The analog adder 6Cb adds the adjustment signals xC3 and xC4 to generate an addition signal yC2 and outputs the addition signal yC2 to the discriminator 7b.

The analog adders 6Ca and 6Ca can be configured as a part of an analog circuit processing the electrical signals e1 and e2, which are analog signals. The analog adders 6Ca and 6Ca generate the addition signals yC1 and yC2 as analog signals.

The discriminator 7a restores and extracts the OOK signal s1 from the addition signal yC1 output from the analog adder 6Ca. The discriminator 7b restores and extracts the OOK signal s2 from the addition signal yC2 output from the analog adder 6Cb.

The ADCs 9a and 9b, the calculator 4, the analog level adjuster 5C, the analog adders 6Ca and 6Ca, and the discriminators 7a and 7b illustrated in FIG. 3 can constitute a DSP of the optical receiver 100C.

According to the optical receiver 100C of the third embodiment, in a case where optical receivers are manufactured in small quantities, configuring the level adjuster and the adder as an analog circuit eliminates a need for a plurality of operations for designing and manufacturing a photo mask, which are required to manufacture digital circuits. This enables a reduction in the initial manufacturing cost of the optical receiver 100C.

EXAMPLE

An example of the optical receiver 100B according to the second embodiment will be described. In the present example, in the optical transmission system including the optical receiver 100B, for example, a DP-OOK signal including optical signals with two different wavelengths×25 Gbit/s at a frequency interval of 14 GHz was used as a transmission signal transmitted from the optical transmitter included in the optical transmission system to the optical receiver 100B. A 80-km single mode fiber (SMF) was used as an optical transmission path connecting the optical transmitter and the optical receiver 100B. Under these conditions, transmission characteristics after SMF transmission were evaluated.

Figure 4:
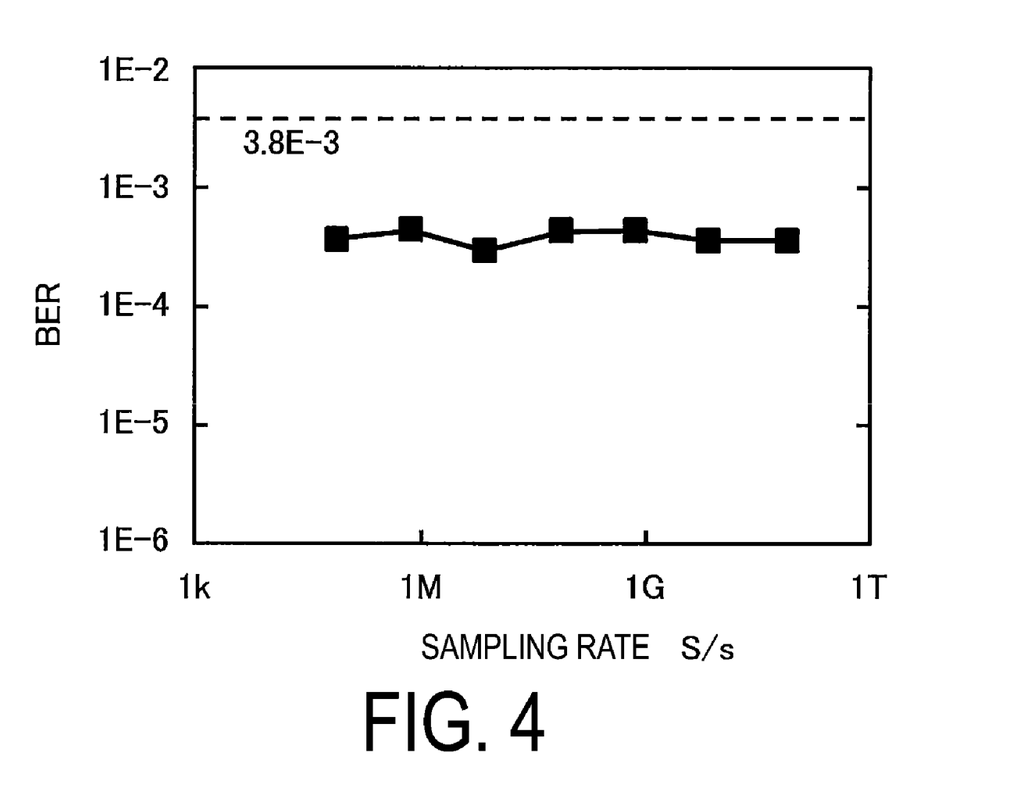
FIG. 4 is a diagram illustrating a relationship between a sampling rate and a bit error rate in an example of the optical receiver according to the second embodiment.

FIG. 4 is a graph illustrating the relationship between a sampling rate and a bit error rate (BER) in the present example. When the digital signals c1 and c2 (FIG. 2) were sampled at a sampling rate (S/s) of 80 GS/s, which constitutes the horizontal axis of the graph, the OOK signals s1 and s2 restored and extracted by the discriminator 7a of the optical receiver 100B indicated a BER of approximately 3.0E-3 ($3.0 \times 10^{-3}$) with respect to the above transmission signal input to the optical receiver 100B (see the rightmost plot in FIG. 4).

Here, the downsampler 3 was used to downsample the digital signals c1 and c2, and with the sampling rate gradually reduced from 80 GS/s to 80 kS/s, the BER was measured. As a result, as illustrated in FIG. 4, the BER indicated a substantially fixed value and was successfully kept lower than a reference value (3.8E-3) of the BER even at a low sampling rate such as 80 kS/s (see the leftmost plot in FIG. 4).

The results in the graph illustrated in FIG. 4 mean that equivalent transmission performance can be achieved even when downsampling is performed by calculating the coefficient of the polarization separation matrix by the calculator 4, adjusting the signal level by the digital level adjuster 5B, and executing addition processing by the digital adders 6Ba and 6Bb. Consequently, although the related art requires a dedicated DSP executing very-high-speed signal processing, the use of the present invention allows a general-purpose inexpensive CPU (low speed) to replace the DSP. As a result, compared to the related art, the present invention is expected to make significant improvement in terms of cost and power consumption.

The results produced by the example in FIG. 4 relate to the optical receiver 100B performing signal level adjustment and addition processing on the digital signals. However, the results also apply to the optical receiver 100C (third embodiment) performing signal level adjustment and addition processing on the analog signals. The results also apply to the optical receiver 100A including the inventions of the optical receivers 100B and 100C.

Others (a): For the level adjuster 5A of the first embodiment, the configuration of the level adjuster 5A (for example, the number of the coefficient-by-coefficient adjusters is freely determined), an input aspect used when the electrical signals e1 and e2 are input to the level adjuster 5A, and an output aspect used when the adjustment signals xA1 to xA4 are output from the level adjuster 5A are not limited to those illustrated in FIG. 1, and various configurations and aspects can be adopted. The main function of the level adjuster 5A is to adjust the input electrical signals e1 and e2 in accordance with the coefficients $h_{ij}$ of the polarization separation matrix, and to output the plurality of adjustment signals to the adders 6Aa and 6Ab.

For the adders 6Aa and 6Ab of the first embodiment, the configuration of the adders 6Aa and 6Ab (for example, a single adder may be provided), an input aspect used when the adjustment signals xA1 to xA4 are input to the adders 6Aa and 6Ab, and an output aspect used when the addition signals yA1 and yA2 are output from the adders 6Aa and 6Ab (one type of addition signal may be output) are not limited to those illustrated in FIG. 1, and various configurations and aspects can be adopted. The main function of the adders is to add the plurality of input adjustment signals and output the addition signals to the discriminators 7a and 7b.

For the discriminators 7a and 7b of the first embodiment, the configuration of the discriminators 7a and 7b (for example, a single discriminator may be provided), an input aspect used when the addition signals yA1 and yA2 are input to the discriminators 7a and 7b, and a restoration and extraction aspect used when the OOK signals s1 and s2 are restored and extracted by the discriminators 7a and 7b are not limited to those illustrated in FIG. 1, and various configurations and aspects can be taken. The main function of the discriminators is to restore and extract the OOK signals s1 and s2 from the input addition signals.

(b): The above description in (a) also applies to the digital level adjuster 5B, the digital adders 6Ba and 6Bb, and the discriminators 7a and 7b in the second embodiment (FIG. 2), and to the analog level adjuster 5C, the analog adders 6Ca and 6Cb, and the discriminators 7a and 7b in the third embodiment (FIG. 3).

(c): Techniques obtained by appropriately combining various techniques described in the embodiments can also be achieved.

REFERENCE SIGNS LIST 100A to 100C Optical receiver
1 Interleaver (IL)
2a, 2b Optical/Electrical converter (O/E)
3 Downsampler
4 Calculator
5A Level adjuster
5B Digital level adjuster
5C Analog level adjuster
6Aa, 6Ab Adder
6Ba, 6Bb Digital adder
6Ca, 6Cb Analog adder
7a, 7b Discriminator
8a, 8b ADC (first A/D converter)
9a, 9b ADC (second A/D converter)

The invention claimed is:

1. An optical receiver configured to receive a polarization multiplexed signal obtained by performing orthogonal polarization multiplexing on two optical signals, the optical receiver comprising:
    an interleaver configured to split the polarization multiplexed signal into two transmitted signals that are asymmetric in terms of a light transmission characteristic;
    an optical/electrical converter configured to convert the transmitted signals resulting from the split into electrical signals;
    an A/D converter configured to convert, into digital signals, the electrical signals being analog signals, and configured to downsample the electrical signals to generate low-speed digital signals;
    a calculator configured to calculate coefficients of a polarization separation matrix from the generated low-speed digital signals;
    a level adjuster configured to adjust, in accordance with the coefficients resulting from the calculation, signal levels of the electrical signals resulting from the conversion to generate a plurality of adjustment signals;
    an adder configured to add the generated adjustment signals to generate addition signals, wherein the level adjuster and the adder are configured as an analog circuit configured to process the electrical signals; and
    a discriminator configured to restore and extract the two optical signals from the generated addition signals.

2. The optical receiver according to claim 1, wherein the polarization multiplexed signal comprises a Dual Polarization-On Off Keying signal.

3. The optical receiver according to claim 1, wherein the A/D converter is
    configured to downsample the electrical signals at a first sampling rate of 80 GS/s resulting from the conversion to generate the low-speed digital signals at a second sampling rate of 80 kS/s.

4. The optical receiver according to claim 1, wherein the optical receiver is configured to receive the polarization multiplexed signal transmitted at a frequency interval of 14 GHz.

5. An optical transmission system comprising:
an optical transmitter;
an optical receiver configured to receive a polarization multiplexed signal obtained by performing orthogonal polarization multiplexing on two optical signals, the optical receiver comprising:
- an interleaver configured to split the polarization multiplexed signal into two transmitted signals that are asymmetric in terms of a light transmission characteristic;
- an optical/electrical converter configured to convert the transmitted signals resulting from the split into electrical signals;
- an A/D converter configured to convert, into digital signals, the electrical signals being analog signals, and configured to downsample the electrical signals to generate low-speed digital signals;
- a calculator configured to calculate coefficients of a polarization separation matrix from the generated low-speed digital signals;
- a level adjuster configured to adjust, in accordance with the coefficients resulting from the calculation, signal levels of the electrical signals resulting from the conversion to generate a plurality of adjustment signals;
- an adder configured to add the generated adjustment signals to generate addition signals, wherein the level adjuster and the adder are configured as an analog circuit configured to process the electrical signals; and
- a discriminator configured to restore and extract the two optical signals from the generated addition signals.

6. The optical transmission system according to claim 5, wherein the polarization multiplexed signal comprises a Dual Polarization-On Off Keying signal.

7. The optical transmission system according to claim 5, wherein the A/D converter is
configured to downsample the electrical signals at a first sampling rate of 80 GS/s resulting from the conversion to generate the low-speed digital signals at a second sampling rate of 80 kS/s.

8. The optical transmission system according to claim 5, wherein the optical receiver is configured to receive the polarization multiplexed signal transmitted at a frequency interval of 14 GHz.

* * * * *